United States Patent [19]

Calabro

[11] Patent Number: 5,194,410
[45] Date of Patent: Mar. 16, 1993

[54] CRYSTALLINE MOLECULAR SIEVE SYNTHESIS USING QUATERNARY AMMONIUM-FUNCTIONALIZED ORGANOSILICONATE

[75] Inventor: David C. Calabro, Somerset, N.J.

[73] Assignee: Mobil Oil Corporation, Fairfax, Va.

[21] Appl. No.: 792,572

[22] Filed: Nov. 15, 1991

[51] Int. Cl.⁵ .................. B01J 29/28; C01B 33/28
[52] U.S. Cl. ........................ 502/62; 423/277; 423/326; 423/705
[58] Field of Search ............. 423/328, 329, 328 T, 423/329 T, 328 C, 326, 277, 62

[56] References Cited

U.S. PATENT DOCUMENTS

| | | | |
|---|---|---|---|
| 3,560,385 | 2/1971 | Roth | 252/49.6 |
| 3,702,886 | 11/1972 | Argauer et al. | 423/328 |
| 3,730,701 | 5/1973 | Isquith et al. | 71/67 |
| 3,832,449 | 8/1974 | Rosinski et al. | 423/328 |
| 4,104,294 | 8/1978 | Grose et al. | 260/448 |
| 4,375,573 | 3/1983 | Young | 585/467 |
| 4,528,171 | 7/1985 | Casci et al. | 423/329 T |
| 4,568,654 | 2/1986 | Valyocsik | 502/62 |

FOREIGN PATENT DOCUMENTS

| | | | |
|---|---|---|---|
| 146922 | 8/1984 | Japan | 423/328 C |
| 199112 | 1/1978 | U.S.S.R. | 423/328 C |

Primary Examiner—Carl F. Dees
Attorney, Agent, or Firm—Alexander J. McKillop; Charles J. Speciale; Laurence P. Hobbes

[57] ABSTRACT

This invention relates to a method for preparing crystalline silicates such as zeolites from a forming mixture containing quaternary ammonium-functionalized organosiliconate as a directing agent. The products prepared depend, inter alia, on reaction conditions such as temperature, crystallization time, and pH. More particularly, this invention relates to the use of a quaternary ammonium-functionalized organosiliconate in the preparation of ZSM-5, ZSM-48, ZSM-51 and the ZSM-48 composition thus prepared.

15 Claims, No Drawings

CRYSTALLINE MOLECULAR SIEVE SYNTHESIS USING QUATERNARY AMMONIUM-FUNCTIONALIZED ORGANOSILICONATE

This application is related by subject matter to Ser. No. 07/792,573 filed on even date herewith.

FIELD OF THE INVENTION

This invention relates to a method for preparing crystalline silicates such as zeolites from a forming mixture containing quaternary ammonium-functionalized organosiliconate as a directing agent. It is particularly suited to the preparation of zeolites such as ZSM-5, ZSM-48 and ZSM-51.

BACKGROUND OF THE INVENTION

Synthetic crystalline silicate materials are now used extensively as catalysts in a number of industries, especially the petroleum refining, petrochemical and chemical industries. These synthetic silicate catalytic materials are generally characterized as being solid, porous, crystalline silica-containing materials whose utility as catalysts is predicated upon their possession of defined and characteristic pore sizes and ordered, internal structures which confer specific catalytic properties on these materials. The most common class of synthetic silicate catalysts has been the aluminosilicate zeolites and of these, the materials which have probably been produced in the largest quantities are the large pore size aluminosilicate zeolites, exemplified by the synthetic faujasites zeolite X and zeolite Y, which are widely used in the catalyst cracking process of converting high-boiling petroleum feeds to lower-boiling products, especially gasoline, as well as in the hydrocracking process which also forms an important part of petroleum refinery operations. The other class of synthetic silicate catalytic materials which are produced in large quantities are the intermediate pore size silicates, especially the intermediate pore size aluminosilicate zeolites, such as ZSM-5, which are important catalysts in many petrochemical processes such as the isomerization of xylenes, the disproportionation of toluene, the production of various para-substituted aromatic compounds, e.g., paraethyltoluene, as well as in petroleum refining processes, especially catalytic dewaxing, e.g., the dewaxing of distillates and the dewaxing of lubricants. The intermediate pore size materials which have achieved the greatest success are the aluminosilicate zeolites and these may have various silica:alumina ratios, typically from about 30:1 or higher, e.g., 70:1, 200:1 or even higher. It is, however, not required that the silicate should be an aluminosilicate because other trivalent metals may provide the required acidic functionality which characterizes these catalytic materials. For example, U.S. Pat. No. 3,702,886, which describes ZSM-5 discloses the possibility for using gallium as a substitute for aluminum, U.S. Pat. No. 4,269,813 and BE 859,056 disclose borosilicate materials, and U.S. Pat. No. 4,238,318 discloses ferrosilicates which also possess shape-selective catalytic properties characterized by the possession of acidic functionality at internal sites within the structure of the silicate to which access is controlled by the characteristic crystalline structure of the silicate. Other trivalent cations such as chromium or phosphorus may also be present in these silicates, as disclosed, for example, in U.S. Pat. No. 4,414,423; 4,417,086; 4,517,396 and 4,309,280. The presence of metals within the silicate structure is, in fact, by no means essential to the crystalline structure or to the possession of catalytic properties, as disclosed in U.S. Pat. No. 3,941,871. A material described as a silica polymorph is described in U.S. Pat. No. 4,061,724 which has now been established to be zeolite ZSM-5, Nature 296, 530 (1982), J. Catalysis 61, 390–396 (1980). An organosilicate with very high silica content is described in U.S. Pat. No. 3,941,871. Thus, notwithstanding differences in the specific compositions of these various silicate materials, they are considered to have a sufficient community that they are regarded as belonging to a defined class with recognized common characteristics.

A number of synthetic intermediate pore size zeolites are now known which are useful for their shape selective catalytic properties. Among them are zeolites ZSM-5, ZSM-11, ZSM-22, theta-1 which is isostructural with ZSM-22 and ZSM-23. These zeolites, their properties and utilities are described in *Catal. Rev.-Sci. Eng.* 28 (2&3), 185–264 (1986).

Other synthetic zeolites include, for example, zeolite beta (U.S. Pat. No. 3,308,069), synthetic mordenites including TEA mordenite, TMA-offretite and large pore size zeolites including ZSM-20 and ZSM-4. These materials have been investigated for various utilities in the petrochemical and petroleum refining industries and many uses for them have been found.

These silicate materials are conventionally produced by the crystallization of the silicate from an aqueous gel or slurry which is being prepared by adding a source of silica together with other appropriate ingredients to water and permitting the crystallization to occur under defined conditions which promote the crystallization of the desired species. Silica may be provided by various sources including silica itself in the form of colloidal silica, precipitated silica, silica gel, silica hydrosols or of silica compounds including silicic acid, metal silicates especially sodium silicate or other alkali metal silicates and metallosilicates including aluminosilicates, e.g., sodium aluminosilicates, and other materials which will function as a source of silica for the zeolite. The silica source may also function as a source of other components of the zeolite, for example, sodium aluminosilicate also functions as a source of aluminum. When aluminosilicates are being produced, the aqueous synthesis mixture usually contains a source of silica, a source of alumina, such as an aluminum salt, e.g., aluminum sulfate or aluminum nitrate, water and, in many cases, an organic directing agent or "template" which promotes the formation of the desired species, for example, an amine or a tetraalkylammonium cation such as tetrapropylammonium (TPA) or tetraethylammonium (TEA) cations. U.S. Pat. No. 3,702,886, for example, discloses the use of tetraalkylammonium cations, especially TPA, for the preparation of ZSM-5; U.S. Pat. No. 4,139,600 discloses the use of alkyldiamines; U.S. Pat. No. 4,296,083 discloses the use of ethylenediamine and other amines including trialkylamines; U.S. Pat. No. 4,151,189 discloses the use of various primary amines as a directing agent for ZSM-5, ZSM-12, ZSM-35 and ZSM-38; U.S. Pat. No. 4,565,681 discloses the use of mixed-alkyl ammonium compounds; and U.S. Pat. No. 4,100,262 discloses the use of tetraalkylammonium compounds in combination with a tetraurea cobalt (II) complex. Other systems are also known. However, the presence of the organic component is not always necessary since it is possible to produce selected aluminosilicate zeolite species without the use of a directing agent under particular, defined conditions, as described in U.S. Pat. Nos. 4,175,114; 4,199,556; 4,257,885 and 4,341,748 to Which reference is made for a description of such processes. Furthermore, control of the composition of the synthesis mixture may result in different zeolites being produced; to take one instance, zeolite beta may be produced using a TEA component under defined ranges of mixture composition, whereas mordenite may be produced under other defined ranges. The effect of these compositional changes is, however, established and there is a significant predictability in the species which are produced from any particular synthesis mixture. This has resulted in the large scale commercial preparation of aluminosilicate zeolites such as the synthetic faujasites especially zeolite Y, zeolite beta and in various forms of ZSM-5 with differing silica:alumina ratios, as well as in the production of certain borosilicate catalysts.

The manufacturing processes used in the commercial scale synthesis of silicate catalytic materials of the types described above conventionally employ large vats or autoclaves for step-wise mixing, gel aging and final crystallization of the product. Processes of this type are reviewed in "Zeolite Molecular Sieves", D. W. Breck, John Wiley and Sons, New York, 1974, Ch. 9 and "Zeolite Chemistry and Catalysis", J. A. Rabo, American Chemical Society, Washington, D.C., 1976. In general, the zeolites have been produced in batch type processes, using large autoclaves, either static or stirred. They may, however, be produced in a continuous process as referred to, for example, in Belgium Patent No. 869,156, to which reference is made for details of such a continuous process.

As noted above, silica may be provided by various sources including those which may also function as a source of other components of the zeolite, e.g., as a source of aluminum. In systems utilizing organic directing agent, it would be useful to provide a directing agent which provides a templating site in close proximity to the growing framework structure of the crystalline silicate. Such an organic directing agent would thus facilitate encapsulation of the template into the growing framework, thereby affecting the nucleation and crystallization processes.

SUMMARY OF THE INVENTION

It has now been found that a solid crystalline silicate product can be prepared from a crystallization mixture by a method which comprises preparing a crystallization mixture which comprises water, a source of silica, a source of an alkali or alkaline earth metal, M, and a quaternary ammonium organosiliconate as directing agent; subjecting said crystallization mixture to crystallization conditions; and recovering the resulting solid crystalline silicate product.

According to the present invention, a wide variety of crystalline silicates can be prepared, including those having the structure of ZSM-5, ZSM-48, and ZSM-51. Moreover, the present invention relates to a composition of matter, ZSM-48, which contains quaternary ammonium organosiliconate.

The use of ammonium-functionalized organosiliconate as directing agent is believed unique in crystalline silicate synthesis. Such directing agents contain a quaternary ammonium templating center covalently linked by a hydrocarbon chain to a siloxane site which can be incorporated into the growing silica framework, thereby facilitating encapsulation of the template into the growing framework. Another feature of the use of such directing agents is their provision of both a source of silicon for incorporation into the silicate framework as well as a quaternary ammonium templating moiety.

DETAILED DESCRIPTION OF THE INVENTION

The present invention is applicable to the synthesis of crystalline silicate solids from synthesis mixtures containing an ammonium-functionalized organosiliconate directing agent and source of silica which provides the silica component of the final, crystalline silicate product. The process is, therefore, particularly applicable to the synthesis of aluminosilicate zeolites which may be produced from such silica containing synthesis mixtures as well as to other metallosilicates including gallosilicates, chromosilicates, borosilicates and ferrosilicates such as those described above, especially the aluminosilicates, borosilicates and ferrosilicates of U.S. Pat. Nos. 3,702,886, 4,269,813 and 4,238,318. It may be used regardless of the content of the trivalent metal which is used in combination with the silica although different crystallization times may be observed with synthesis mixtures of different composition. The ratio of the silica to the trivalent cation may be varied over a wide range according to the composition of the desired silicate product which may typically vary, for example, from a low value of about 2:1 to 3:1 for the aluminosilicate zeolite X, up to extremely high values which in theory may approach infinity for highly siliceous products such as ZSM-5. Thus, the method will be applicable with highly siliceous materials such as the silicates disclosed in U.S. Pat. No. 3,941,871 and the material referred to as a silica-polymorph in U.S. Pat. No. 4,061,724, which is, in fact, ZSM-5 as mentioned above. In most commercial syntheses, however, alumina will be present as an inevitable impurity and extremely high silica:alumina ratios will usually not be obtained unless special measures are taken to exclude aluminum from the synthesis mixture.

In the synthesis of these crystalline, silicate products, a synthesis mixture containing a source of silica and organic directing agent is prepared together with other desired components, depending upon the identity of the desired product. The synthesis mixture will in most cases be an aqueous mixture, but other non-aqueous media such as ethylene glycol may also be used as the continuous phase of the mixture but the use of ethylene glycol based synthesis mixture is described in Bibby, D.M. and Dale, M.P., Formation of High-Silica Sodalite, Nature. 317 (1985), 157–58, to which reference is made for description of the synthesis.

The silica is provided by one or more of the source materials described above and, if aluminum or another trivalent metal is to be present in the final product, it will generally be added in the form of a water soluble salt, such as aluminum sulfate, ferrosulfate, etc., although the metal cations which provide the acidity in the final catalytic product may find their way into the product either as impurities or in the original starting materials. In order to maintain a predetermined composition in the product it will generally, however, be preferable to employ starting materials of known purity and composition so that composition control is maintained.

Prior art techniques have resulted in the formation of a great variety of synthetic zeolites. The zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite beta (U.S. Pat. No. 3,308,069); ZK-5 (U.S. Pat. No. 3,247,195); ZK-4 (U.S. Pat. No. 3,314,752); ZSM-5 (U.S. Pat. No. 3,702,886); ZSM-5/ZSM-11 intermediate (U.S. Pat. No. 4,229,424); ZSM-11 (U.S. Pat. No. 3,709,979); ZSM-12 (U.S. Pat. No. 3,832,449); zeolite ZSM-20 (U.S. Pat. No. 3,972,983); ZSM-22 (U.S. Pat. No. 4,556,477); ZSM-23 (U.S. Pat. No. 4,076,842); ZSM-35 (U.S. Pat. No. 4,016,245); ZSM-38 (U.S. Pat. No. 4,046,859); zeolite ZSM-48 (U.S. Pat. No. 4,375,573), and ZSM-51 (U.S. Pat. No. 4,568,654) merely to name a few. All of the above patents are incorporated herein by reference.

The silicon/aluminum atomic ratio of a given zeolite is often variable. For example, zeolite X can be synthesized with silicon/aluminum atomic ratios of from 1 to 1.5; zeolite Y, from 1.5 to about 3. In some zeolites, the upper limit of the silicon/aluminum atomic ratio is unbounded. ZSM-5 is one such example wherein the silicon/aluminum atomic ratio is at least 12. U.S. Pat. No. 3,941,871 (Re. 29,948) discloses a porous crystalline silicate made from a reaction mixture containing no deliberately added aluminum in the recipe and exhibiting the X-ray diffraction pattern characteristic of ZSM-5 type zeolites. U.S. Pat. Nos. 4,061,724; 4,073,865 and 4,104,294 describe crystalline silicates of varying aluminum and metal content. These zeolites can consist essentially of silica, containing only trace amounts of aluminum.

The chemical composition of the forming mixture, in terms of moles per mole $SiO_2$, includes:

|  | Broad | Preferred | Most Preferred |
|---|---|---|---|
| $H_2O/SiO_2$ | 5 to 500 | >20 to 500 | >40 to 500 |
| $X_2O_3/SiO_2$ | 0 to 0.2 | 0 to 0.014 | 0 to 0.010 |
| $OH^-/SiO_2$ | 0 to 2 | 0.02 to 0.15 | 0.02 to 0.15 |
| $DA/SiO_2$ | 0.05 to 2 | 0.05 to 0.50 | 0.05 to 0.25 | wherein DA is the ammonium organosiliconate directing agent.

The crystallization mixture is maintained for a period of from 72 to 600 hours, preferably 96 to 450 hours, at a temperature of from 100° to 220° C., preferably 150° to 180° C. to effect crystallization.

In those instances where ZSM-5 is to be prepared, the chemical composition of the forming mixture, in terms of moles per mole $SiO_2$, includes:

|  | Broad | Preferred | Most Preferred |
|---|---|---|---|
| $H_2O/SiO_2$ | 20 to 80 | 20 to 50 | 23 to 32 |
| $X_2O_3/SiO_2$ | 0 to 0.05 | 0 to 0.03 | 0 to 0.015 |
| $OH^-/SiO_2$ | 0.10 to 1 | 0.10 to 0.60 | 0.30 to 0.45 |
| $DA/SiO_2$ | 0.05 to 2 | 0.05 to 0.50 | 0.10 to 0.30 | wherein DA is the ammonium organosiliconate directing agent.

The crystallization mixture is maintained for a period of from 72 to 600 hours, preferably 96 to 312 hours, at a temperature of from 100° to 220° C., preferably 160° to 200° C. to effect crystallization.

In those instances where ZSM-48 is to be prepared, the chemical composition of the forming mixture, in terms of moles per mole $SiO_2$, includes:

|  | Broad | Preferred | Most Preferred |
|---|---|---|---|
| $H_2O/SiO_2$ | 15 to 70 | 15 to 45 | 18 to 30 |
| $X_2O_3/SiO_2$ | 0 to 0.01 | 0 to 0.01 | 0 to 0.005 |
| $OH^-/SiO_2$ | 0.10 to 1 | 0.10 to 0.60 | 0.10 to 0.20 |
| $DA/SiO_2$ | 0.05 to 2 | 0.10 to 0.40 | 0.10 to 0.20 | wherein DA is the ammonium organosiliconate directing agent.

The crystallization mixture is maintained for a period of from 300 to 600 hours, preferably 400 to 500 hours, at a temperature of from 100° to 200° C., preferably 140° to 200° C. to effect crystallization.

The synthetic crystalline ZSM-48 zeolite material thus made has the formula, in terms of mole ratios of oxides, in the anhydrous state as follows:

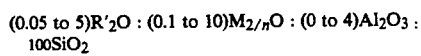
(0.05 to 5)$R'_2O$ : (0.1 to 10)$M_{2/n}O$ : (0 to 4)$Al_2O_3$ : 100$SiO_2$ wherein R' is represented by the formula

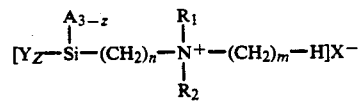
$$[Y_z-Si-(CH_2)_n-\overset{R_1}{\underset{R_2}{N^+}}-(CH_2)_m-H]X^-$$
$$\overset{A_{3-z}}{|}$$

wherein
Y is a hydrolyzable radical selected from hydroxy, halogen, alkoxy, and aryloxy
X is a an anion selected from halide, sulfate, phosphate and carbonate, preferably chloride or bromide;
$R_1$ is an alkyl radical of 1 to 4 carbon atoms such as methyl, ethyl, propyl, isopropyl, butyl or isobutyl, and preferably methyl;
$R_2$ is an aliphatic radical of 1 to 4 carbon atoms such as methyl, ethyl, propyl, isopropyl, butyl or isobutyl, or an aromatic radical of 6 to 8 carbons such as benzyl or ethyl benzyl;
A is an aliphatic radical of 1 to 4 carbons or an aromatic radical of 6 to 8 carbons;
n is 1 to 6;
m is 1 to 18; and
z is 2 to 3 in an alkaline buffered aqueous/organic vehicle.

The X-ray diffraction pattern of ZSM-48 has the significant lines shown in Table i and is further characterized by the fact that it exhibits a singlet line within the range of 11.8±0.2 Angstrom units. The presence of only a singlet line at the indicated spacing structurally distinguishes the ZSM-48 material from closely related materials such as ZSM-12 (U.S. Pat. No. 3,832,449) which has a doublet (two lines) at 11.8±0.2 Angstrom units and high silica ZSM-12 (U.S. Pat. No. 4,104,294) which also exhibits a doublet at 11.8±0.2 Angstrom units.

TABLE 1

Characteristics Lines of Zeolite ZSM-48

| d(A) | Relative Intensity ($I/I_o$) |
|---|---|
| 11.8 ± 0.2 | S |
| 10.2 ± 0.2 | W-M |
| 7.2 ± 0.15 | W |
| 4.2 ± 0.08 | VS |
| 3.9 ± 0.08 | VS |
| 3.6 ± 0.06 | W |
| 3.1 ± 0.05 | W |

TABLE 1-continued

| Characteristics Lines of Zeolite ZSM-48 | |
|---|---|
| d(A) | Relative Intensity (I/$I_o$) |
| 2.85 ± 0.05 | W |

These values were determined by standard techniques. The radiation was the K-alpha doublet of copper, and a diffractometer equipped with a scintillation counter and a strip chart pen recorder was used. The peak heights, I, and the positions as a function of two times theta, where theta is the Bragg angle, were read from the spectrometer chart. From these, the relative intensities, 100 $I/I_{94}$, where $I_\sigma$ is the intensity of the strongest line or peak, and d (obs.), the interplanar spacing in Angstroms (A) corresponding to the recorded lines, were calculated. In Table 1 the relative intensities are given in terms of the symbols W=weak, VS=very strong and W-M=weak-to-medium (depending on the cationic form). Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

In those instances where ZSM-51 is to be prepared, the chemical composition of the forming mixture, in terms of moles per mole $SiO_2$, includes:

| | Broad | Preferred | Most Preferred |
|---|---|---|---|
| $H_2O/SiO_2$ | 15 to 80 | 15 to 45 | 18 to 35 |
| $X_2O_3/SiO_2$ | 0 to 0.012 | 0 to 0.010 | 0 to 0.0080 |
| $OH^-/SiO_2$ | 0.10 to 0.40 | 0.10 to 0.25 | 0.15 to 0.22 |
| $DA/SiO_2$ | 0.05 to 2 | 0.10 to 0.50 | 0.15 to 0.20 | wherein DA is the ammonium organosiliconate directing agent.

The crystallization mixture is maintained for a period of from 120 to 250 hours, preferably 140 to 250 hours, at a temperature of from 150° to 220° C., preferably 160° to 200° C. to effect crystallization.

In general, preferred forming mixture compositions are those combining a high $H_2O/YO_2$ ratio (towards the upper end of the indicated range), a low $X_2O_3/YO_2$ ratio and a low $OH^-/YO_2$ ratio.

The product obtained from the synthesis will depend, naturally, upon the selected synthesis system and may be, for example, an intermediate pore size zeolite such as those having the structure of ZSM-5, ZSM-11, ZSM-12, ZSM-22, ZSM-23, ZSM-35, ZSM-38, ZSM-48, ZSM-51 or a large pore zeolite such as zeolite Y, ZSM-4 or ZSM-20. Other synthetic zeolites which may be produced from such synthesis mixtures include mordenite, TEA mordenite, TMA offretite, zeolite beta and small pore size zeolites such as zeolite A. The selection of the synthesis mixture will therefore be made in accordance with known factors, depending on the desired product.

The silicate product prepared by the present invention can be generally described as a molecular sieve having a composition in terms of mole ratios of oxides as follows:

$$X_2O_3:nSiO_2$$

wherein x is a trivalent element of at least one member selected from the group consisting of aluminum, boron, iron and gallium, preferably aluminum and n is at least 2, preferably from 20 to 1000.

Quaternary ammonium functionalized organosiliconates are believed to be unique as directing agents in crystalline silicate synthesis by virtue of their inclusion of a potential framework T-atom bound covalently to the cationic center. These compounds are characterized by $(RO)_3Si$-functionalized via a Si-C bond with a variety of organic substituents. Covalently linking the directing agent (or template) to the framework facilitates encapsulation during the very early stages of silicate polymerization and precursor formation. These organosiliconates have a diverse range of commercial applications including coupling agents for plastics reinforcements, detergents, scale inhibition, dispersants, antimicrobials and adhesives.

Suitable organosilicon quaternary ammonium salts for use in the present invention can be represented by the formula:

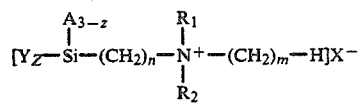

wherein
Y is selected from a hydrolyzable radical, selected from hydroxy, alkoxy and aryloxy
X is a halide, preferably chloride, bromide, or other anion selected from sulfate, phosphate and carbonate;
$R_1$ is an alkyl radical of 1 to 4 carbon atoms such as methyl, ethyl, propyl, isopropyl, butyl or isobutyl, and preferably methyl;
$R_2$ is an aliphatic radical of 1 to 4 carbon atoms such as methyl, ethyl, propyl, isopropyl, butyl or isobutyl, or an aromatic radical of 6 to 8 carbons such as benzyl or ethyl benzyl;
A is an aliphatic radical of 1 to 4 carbons or an aromatic radical of 6 to 8 carbons;
n is 1 to 6;
m is 1 to 18; and
z is 2 to 3.

Referring to the above formula of the organosilicon quaternary ammonium salts, the following should be noted. Hydrolyzable radicals include: alkoxy groups containing up to 4 carbon atoms, such as methoxy, ethoxy, isopropoxy, propoxy and butoxy; and halogens such as chlorine, bromine and iodine, and other negative ionic species as well.

Examples of compounds contemplated for use in the present invention include:
hexadecyldimethyl[3-(triethoxysilyl)propyl]ammonium chloride,
hexadecyldimethyl[3(trimethoxysilyl)propyl]ammonium chloride,
octadecyldimethyl[3-(trimethoxysilyl)propyl]ammonium chloride,
stearylmethylbenzyl[3-(triethoxysilyl)propyl]ammonium chloride,
stearylmethylbenzyl[3-(trimethoxysilyl)propyl]ammonium chloride,
stearylmethylethylbenzyl[3-(triethoxysilyl)propyl] ammonium chloride,
stearylmethylethylbenzyl[3-(trimethoxysilyl)propyl]ammonium chloride, tetradecyldimethyl[3-(triethoxysilyl)propyl]ammonium chloride,
tetradecyldimethyl[3-(trimethoxysilyl)propyl]ammonium chloride,
N-triethoxysilylpropyl-N,N,N-trimethylammonium chloride,
N-trimethoxysilylpropyl-N,N,N-trimethylammonium chloride, and
N-trimethoxysilylpropyl-N,N,N-tri-n-butylammonium bromide.

Compounds of the present invention are available commercially or can be prepared by art-recognized methods. For example, octadecyldimethyl[3-(trimethoxysilyl)propyl] ammonium chloride, and N-trimethoxysilyl N,N,N-trimethyl propylammonium chloride and tetradecyldimethyl[3-(trimeth-oxysilyl)propyl]ammonium chloride are commercially available from Petrarch Systems, Inc., Bristol, Pa. Other organosilicon quaternary ammonium salts of the present invention can be readily prepared utilizing procedures described in U.S. Pat. Nos. 3,560,385 and 3,730,701. In general, compounds of the stated formula can be readily synthesized by heating at reflux temperature in a polar solvent such as methanol, ethanol and acetone, an excess of an amine of the formula:

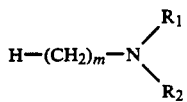

wherein $R_1$, $R_2$ and m are as above-defined, with a silane quaternizing agent of the formula:

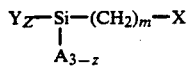

wherein
X, Y and n are as above-defined, and
z is 2 or 3.

The method of synthesis can be either in a batch process, semicontinuous or continuous process. In a continuous or semicontinuous process, a forming solution or slurry is passed through the reaction zone with or without recycle. In the recycle mode, the composition of the solution can be adjusted and maintained at optimal concentrations. This mode of operation is particularly advantageous when very high $H_2/YO_2$ ratios are employed.

The crystalline silicate material may also be calcined before or after removal from the substrate for example in an inert atmosphere or in air at from about 200° to about 700° C. for about 1 hr. to about 50 hrs.

The crystalline silicate may also be treated to adjust its catalytic properties before or after removal from the surface, for example by steaming and/or ion exchange. Low or zero catalytic activity can be obtained by incorporating alkali or alkaline earth cations into the crystalline silicate.

Catalytic activity can be increased by methods known in the art such as by increasing the aluminum content or by introducing a hydrogenation-dehydrogenation function into the crystalline silicate.

The original ions, i.e. cations or anions, of the synthesized crystalline silicate can be replaced in accordance with techniques well known in the art, at least in part, by ion exchange with other cations or anions. Preferred replacing cations include metal ions, hydrogen ions, hydrogen precursor, e.g., ammonium ions and mixtures thereof. Particularly preferred cations include hydrogen, rare earth metals and metals of Groups IIA, IIIA, IVA, IB, IIB, IIIB, IVB, VIB and VIII of the Periodic Table of the Elements.

Typical ion exchange technique would be to contact the synthesized material with a salt of the desired replacing ion or ions. Examples of such salts of cations include the halides, e.g., chlorides, nitrates and sulfates.

Cations may be incorporated into the silicate to neutralize acid sites or to adjust the diffusion properties; preferred cations to be incorporated for these purposes include metals of Groups IA and IIA of the Periodic Table of the Elements, for example, sodium, potassium, magnesium, barium, lithium, strontium, rubidium and cesium.

Siliceous materials containing a relatively high concentration of aluminum ($SiO_2/Al_2O_3$ < 100) can be prepared directly by synthesis. Alternatively, a high $SiO_2/Al_2O_3$ crystalline silicate can be prepared first and aluminum incorporated by post-synthesis treatment, using known methods, e.g., treatment with reactive aluminum compounds such as $AlCl_3$ at elevated temperature; by adding aluminum oxide or hydroxide and treatment under hydrothermal conditions; or by treating with small amounts of sodium aluminate.

Other metals can be incorporated during synthesis (e.g., titanium, tin, iron, gallium, transition metals) or post-synthetically via known processes such as impregnation, ion exchange, vapor deposition and the like.

It is also contemplated that a metal function can be incorporated into the crystalline silicate, such as Pd, Pt, Ru, Mo, W, Ni, Fe, Ag, etc. These metal-containing materials may have essentially no acid activity, or they may have substantial acid activity to provide for dual-functional catalysis. The catalytic activity of the crystalline silicate can be adjusted from essentially zero to high activity, depending on the particular use thereof.

Activity may be correlated with acid character. Siliceous zeolites may be considered to contain $SiO_4$-tetrahedra. Substitution by a trivalent element such as aluminum introduces a negative charge which must be balanced. If this is done by a proton, the material is acidic. The charge may also be balanced by cation exchange with alkali or alkaline earth metal cations.

One measure of catalytic activity may be termed the Alpha Value. When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, vol. 61, p. 395.

The crystalline silicates of the present invention are readily convertible to catalytically active material for a variety of organic, e.g., hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 hr$^{-1}$ to about 20 hr$^{-1}$; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g., benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g., methanol, or ethers, e.g., dimethylether, or mixtures thereof to hydrocarbons including olefins and/or aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g., benzene and alkylbenzenes in the presence of an alkylating agent, e.g., olefins, formaldehyde, alkyl halides and alcohols, with reaction conditions including a temperature of from about 250° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In general, therefore, catalytic conversion conditions over a catalyst comprising the crystalline silicate in active form include a temperature of from about 100° C. to about 760° C., a pressure of from about 0.1 atmosphere (bar) to about 200 atmospheres (bar), a weight hourly space velocity of from about 0.08 hr to about 2000 hr and a hydrogen/organic, e.g., hydrocarbon compound mole ratio of from 0 (no added hydrogen) to about 100.

In order to more fully illustrate the nature of the invention and the manner of practicing same, the following examples are presented.

EXAMPLE 1

A 400 cc plastic beaker was charged with stirring in the following order: 54.3 g distilled water, 0.84 g sodium hydroxide, 10.4 g FLUKA AG, keiselsaure silicic acid and 4.70 g ammonium hydroxide (29%). In a separate plastic vessel was weighed 24.4 g N-trimethoxysilylpropyl-N,N,N-trimethylammonium chloride (STMA), 50% in methanol. This reagent was combined with the contents of the 400 cc beaker with a distilled water rinse (15.9 g). In a separate 150 cc beaker, 2.39 g aluminum nitrate, nonahydrate were dissolved in 26.4 g distilled water and combined with the above mixture.

This entire mixture was charged into a 300 cc autoclave and stirred at 180° C. at autogenous pressure for 20 days. The contents of the autoclave were then filtered, washed (3×30 cc) with methanol, once with distilled water and dried overnight to give a white powder (11.5 g) which was determined by X-ray diffraction as ZSM-5.

EXAMPLES 2-6

The procedure of Example 1 was repeated with variations in Si/Al$_2$, directing agent (R)/Si, alkali metal/Si, OH/Si, crystallization times and temperatures. The resulting products were ZSM-5, ZSM-48 and ZSM-51 as determined by X-ray diffraction. Table 2 below sets out further information relating to Examples 1 to 6.

All syntheses but Example 5 (which used polydimethoxysiloxane) were carried out using FLUKA Kieselsaure, chromatography-grade, silicic acid. STMA was used as the directing agent/silica source in all the Examples except Example 2 which uses N-trimethoxysilylpropyl-N,N,N-tri-n-butylammonium bromide (STBA), 50% in methanol. Crystallizations were carried out in stirred, 300 ml autoclave reactors. Crystallinity was monitored periodically by cooling, sampling and obtaining an X-ray powder pattern on a small sample using the Guinier camera. When crystalline, products were filtered, washed with methanol then water, and dried overnight at 80° C.

TABLE 2

| EXAMPLE | PRODUCT | DA | Si/Al$_2$ | R/Si | Na/Si | OH/Si | TEMP. | TIME |
|---|---|---|---|---|---|---|---|---|
| 1 | ZSM-5 | STMA$^a$ | 60 | .23 | .28 | .34 | 180 | 20 d |
| 2 | ZSM-5 | STBA$^b$ | ∞ | .17 | .22 | .49 | 180 | 4 d |
| 3 | ZSM-51 | STMA | ∞ | .17 | .15 | .17 | 180 | 6 d |
| 4 | ZSM-51 | STMA | 120 | .21 | .27 | .24 | 180 | 6 d |
| 5$^c$ | ZSM-51 | STMA | ∞ | .16 | .14 | 0.16 | 180 | 10 d |
| 6 | ZSM-48 | STMA | ∞ | .17 | 20 | .31 | 150 | 18 d |

$^a$STMA = N-trimethoxysilylpropyl-N,N,N-trimethylammonium chloride, 50% in methanol.
$^b$STBA = N-trimethyoxysilylpropyl-N,N,N-tri-n-butylammonium bromide, 50% in methanol.
$^c$Polydimethoxysilane used as silica source.

It is claimed:

1. A method of synthesizing a solid crystalline silicate molecular sieve product from a crystallization mixture which comprises:
   preparing a crystallization mixture which comprises a source of silica, a source of an alkali or alkaline earth metal, M, and a quaternary ammonium organosiliconate;
   subjecting said crystallization mixture to crystallization conditions; and
   recovering the resulting solid crystalline silicate product.

2. The method of claim 1 wherein said product is a molecular sieve having a composition in terms of mole ratios of oxides as follows:

$$X_2O_3:nSiO_2$$

wherein X is a trivalent element of at least one member selected from the group consisting of aluminum, boron, iron and gallium and n is at least 2; and said ammonium organosiliconate has the formula

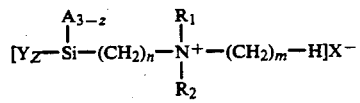

wherein
   Y is a hydrolyzable radical selected from hydroxy, alkoxy and aryloxy;
   X is a halide, or anion selected from sulfate, phosphate and carbonate;
   $R_1$ is an alkyl radical of 1 to 4 carbon atoms such as methyl, ethyl, propyl, isopropyl, butyl or isobutyl, and preferably methyl;
   $R_2$ is an aliphatic radical of 1 to 4 carbon atoms such as methyl, ethyl, propyl, isopropyl, butyl or isobutyl, or an aromatic radical of 6 to 8 carbons such as benzyl or ethyl benzyl;
   A is an aliphatic radical of 1 to 4 carbons or an aromatic radical of 6 to 8 carbons;
   n is 1 to 6;
   m is 1 to 18; and
   z is 2 to 3.

3. The method of claim 2 wherein X is aluminum and n is from 20 to 1000.

4. The method of claim 3 wherein said ammonium organolsiliconate is N-trimethoxylsilylpropyl-N,N,N-trimethylammonium.

5. The method of claim 3 wherein said ammonium organosiliconate is N-trimethoxysilylpropyl-N,N,N-tri-n-butylammonium.

6. The method of claim 1 wherein said product comprises a zeolite having the structure selected from the group consisting of ZSM-5, ZSM-11, ZSM-12, ZSM-22, ZSM-23, ZSM-35, ZSM-48 and ZSM-51.

7. The method of claim 1 wherein said product has the structure of ZSM-5.

8. The method of claim 1 wherein said product has the structure of ZSM-48.

9. The method of claim 1 wherein said product has the structure of ZSM-51.

10. The method of claim 1 wherein said crystallization mixture has the following composition in terms of mole ratios of oxides:

| | |
|---|---|
| $H_2O/SiO_2$ | 5 to 500 |
| $X_2O_3/SiO_2$ | 0 to 0.2 |
| $OH^-/SiO_2$ | 0 to 2 |
| $DA/SiO_2$ | 0.05 to 2 | wherein DA is said directing agent;
and said crystallization mixture is maintained for a period of from 72 to 600 hours at a temperature of from 100 to 220° C.

11. The method of claim 1 wherein said crystallization mixture has the following composition in terms of mole ratios of oxides:

| | |
|---|---|
| $H_2O/SiO_2$ | 20 to 80 |
| $X_2O_3/SiO_2$ | 0 to .05 |
| $OH^-/SiO_2$ | 0.10 to 1 |
| $DA/SiO_2$ | 0.05 to 2 | wherein DA is said directing agent;
and said crystallization mixture is maintained for a period of from 72 to 600 hours at a temperature of from 100° to 220° C.

12. The method of claim 1 wherein said crystallization mixture has the following composition in terms of mole ratios of oxides:

| | |
|---|---|
| $H_2O/SiO_2$ | 15 to 70 |
| $X_2O_3/SiO_2$ | 0 to .01 |
| $OH^-/SiO_2$ | 0.10 to 1 |
| $DA/SiO_2$ | 0.05 to 2 | wherein DA is said directing agent;
and said crystallization mixture is maintained for a period of from 300 to 600 hours at a temperature of from 100 to 200° C.

13. The method of claim 1 wherein said crystallization mixture has the following composition in terms of mole ratios of oxides:

| | |
|---|---|
| $H_2O/SiO_2$ | 15 to 80 |
| $X_2O_3/SiO_2$ | 0 to 0.012 |
| $OH^-/SiO_2$ | 0.1 to 0.4 |
| $DA/SiO_2$ | 0.05 to 2 | wherein DA is said directing agent;
and said crystallization mixture is maintained for a period of from 120 to 250 hours at a temperature of from 150° to 220° C.

14. A synthetic crystalline ZSM-48 zeolite material having the characteristic X-ray diffraction lines of Table 1 and the formula, in terms of mole ratios of oxides, in the anhydrous state as follows:

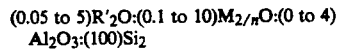

wherein R' is represented by the formula

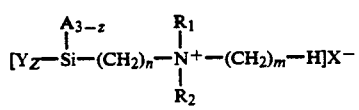

wherein
   Y is a hydrolyzable radical selected from hydroxy, alkoxy and aryloxy;

X is a halide, or anion selected from sulfate, phosphate and carbonate;

$R_1$ is an alkyl radical of 1 to 4 carbon atoms such as methyl, ethyl, propyl, isopropyl, butyl or isobutyl, and preferably methyl;

$R_2$ is an aliphatic radical of 1 to 4 carbon atoms such as methyl, ethyl, propyl, isopropyl, butyl or isobutyl, or an aromatic radical of 6 to 8 carbons such as benzyl or ethyl benzyl;

A is an aliphatic radical of 1 to 4 carbons or an aromatic radical of 6 to 8 carbons;

n is 1 to 6;

m is 1 to 18; and z is 2 to 3.

15. The synthetic crystalline ZSM-48 zeolite material of claim 14 wherein R' is N-trimethoxysilylpropyl-N,N,N-trimethylammonium.

* * * * *